Sept. 8, 1925.

Re. 16,159

A. M. FAIRCHILD

ELECTRICAL INSULATOR

Original Filed May 27. 1918

Witness:
R. Burkhardt.

Inventor:
Alice Maude Fairchild,
By Wilkinson, Huxley, Bergman & Knight Attys

Reissued Sept. 8, 1925. Re. 16,159

UNITED STATES PATENT OFFICE.

ALICE MAUDE FAIRCHILD, OF CHICAGO, ILLINOIS.

ELECTRICAL INSULATOR.

Original No. 1,369,274, dated February 22, 1921, Serial No. 236,933, filed May 27, 1918. Application for reissue filed January 2, 1924. Serial No. 684,175.

*To all whom it may concern:*

Be it known that I, ALICE MAUDE FAIRCHILD, a citizen of the United States, residing at Chicago, in the county of Cook and State of Illinois, have invented certain new and useful Improvements in Electrical Insulators, of which the following is a specification.

My invention relates to insulating material.

More particularly, my invention relates to material characterized by high electrical insulating and high temperature insulating qualities, which material combines with the qualities referred to, the advantages of a high degree of strength or sturdiness with a low coefficient of expansion under temperature changes.

As the description proceeds it will be apparent that the insulating material constituting the subject-matter of my invention has a wide field of usefulness, being adapted for use in spark plugs, in burners which are subjected to high temperatures, in crucibles and in other devices which are subjected to high tension current or to rapid temperature changes.

An object of the present invention, therefore, is to provide a new insulating material which will withstand high temperatures without breakage.

A further object is to provide insulating material having a high insulating quality and great strength.

A further object is to provide an insulating material having a low coefficient of expansion under temperature changes.

A further object of my invention is to provide an insulating material involving non-metallic oxides.

A further object is to provide an improved spark plug well adapted to withstand the heavy duty imposed in practical operation.

As showing one practical use for the insulating material constituting the subject-matter of the present invention, I have illustrated a spark plug such as is used in internal combustion engines.

Referring to the accompanying drawing—

Figure 1:
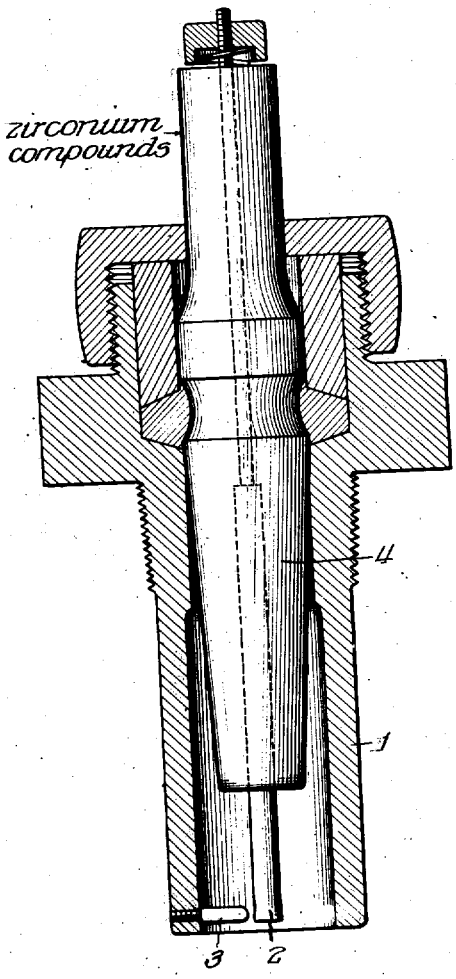
Figure 2:
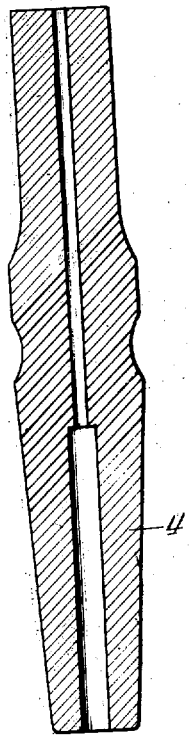

Figure 1 is a view in cross-section of a spark plug showing an insulating member mounted therein; and Figure 2 is a sectional view of the insulating member.

The illustrated spark plug includes a sleeve 1 formed to provide a seat for the insulating member carrying the metallic terminal 2. The member 1, according to the ordinary practice, is of metal and said member 1 carries the electric terminal 3.

The insulating member, which is indicated by the numeral 4, is composed of the material forming the subject-matter of the present invention and is sealed in any preferred manner against the member 1, whereby to prevent the escape of gases from within the combustion cylinder. Said insulating member 4 extends from the inside of said cylinder to the outside thereof.

I have found that zirconium oxide and zirconium silicate, when constituting from 50 to 90% of the mass, forms a ceramic structure having properties which produce an insulating non-metallic structure that has more suitable physical characteristics and desirable properties than any other of the ceramic materials such as stone ware, china and porcelain heretofore known or used in spark plugs and other heat resisting devices.

Zirconia ($ZrO_2$) zirconium oxide has been well known for many years, having been used largely in incandescent mantles of the early Welsbach type and their immediate predecessors. It was next largely used as a substitute for the lime structure in oxyhydrogen or calcium light and its fire resisting properties are well known.

The fact that zirconia formed an important constituent in the structure of the glower in the Nernst lamp might lead to the assumption that it would be unsuitable for use as a heat resisting insulating structure for spark plugs, but I have found by numerous tests that it forms a more desirable constituent of a body for a spark plug insulator than any other of the numerous oxides of other compounds with which I have experimented and that it can be substituted with great improvement for china clay, feldspar, silica, magnesium silicate and many of the other constituents heretofore employed in stoneware, china or porcelain insulators.

Of the various processes for forming earthen ware structures, those depending on water shrinkage such as forming on a wheel or shaping in a plaster of Paris mold or casting, a thin slip cannot be employed where large quantities of zirconia are used on account of its lack of the properties characteristic of clay, that is, capillary shrinkage into a hard compact mass, but structures containing a large quantity of finely ground zirconium silicate such as the mineral zircon or finely ground baddeleyite, a natural ore containing a high percentage of zirconium oxide with from 5 to 15% plastic clay, can be readily formed into quite intricate shapes by what is known as the dry forming process frequently described as pressing a moist dust into steel molds.

A moist granulated zirconium mass containing as little as 5% of clay and about 12% of water can be placed in a closely fitting steel die and subjected to a pressure of from 5 to 8000 pounds to the square inch and formed into a structure that will shrink very little in air drying or oven drying, and which may be fired to any high temperature available without danger of undue fusing or shrinkage.

The chemical reaction between the zirconium compound and the clay will, in the firing process, produce zirconate of alumina, which is a very refractory material.

It has been demonstrated that the material forming the subject-matter of the present invention maintains its high insulating qualities even at very high temperatures.

I claim:

1. A spark plug having metallic conducting electrodes and non-metallic wall forming and insulating means consisting of a ceramic structure formed from plastic clay and zirconium compounds.

2. A spark plug having metallic conducting electrodes and non-metallic wall forming and insulating means comprising a ceramic structure consisting of zirconia compounds and a clay binder.

3. A spark plug having metallic conducting electrodes and non-metallic wall forming and insulating means consisting of a ceramic structure containing clay and zirconium compound.

4. As a new article manufactured, an insulator for spark plugs comprising a ceramic structure of clay containing zirconia compounds in varying proportions.

5. An electric spark plug having a new insulating structure of great mechanical strength and infrangibility under sudden variations of temperature and high electric insulating resistance at high temperature consisting of a ceramic structure comprising zirconium compounds as its principal constituent.

6. An electrical insulator consisting of a ceramic structure composed essentially of zirconium compounds.

7. An electrical insulator comprising a structure of which zirconium is an essential constituent.

8. A spark plug having an electrical insulator consisting of a ceramic structure containing zirconium compounds and a ceramic binder.

Signed at Chicago, Illinois, this 21st day of November, 1923.

ALICE MAUDE FAIRCHILD.